Figure 1:
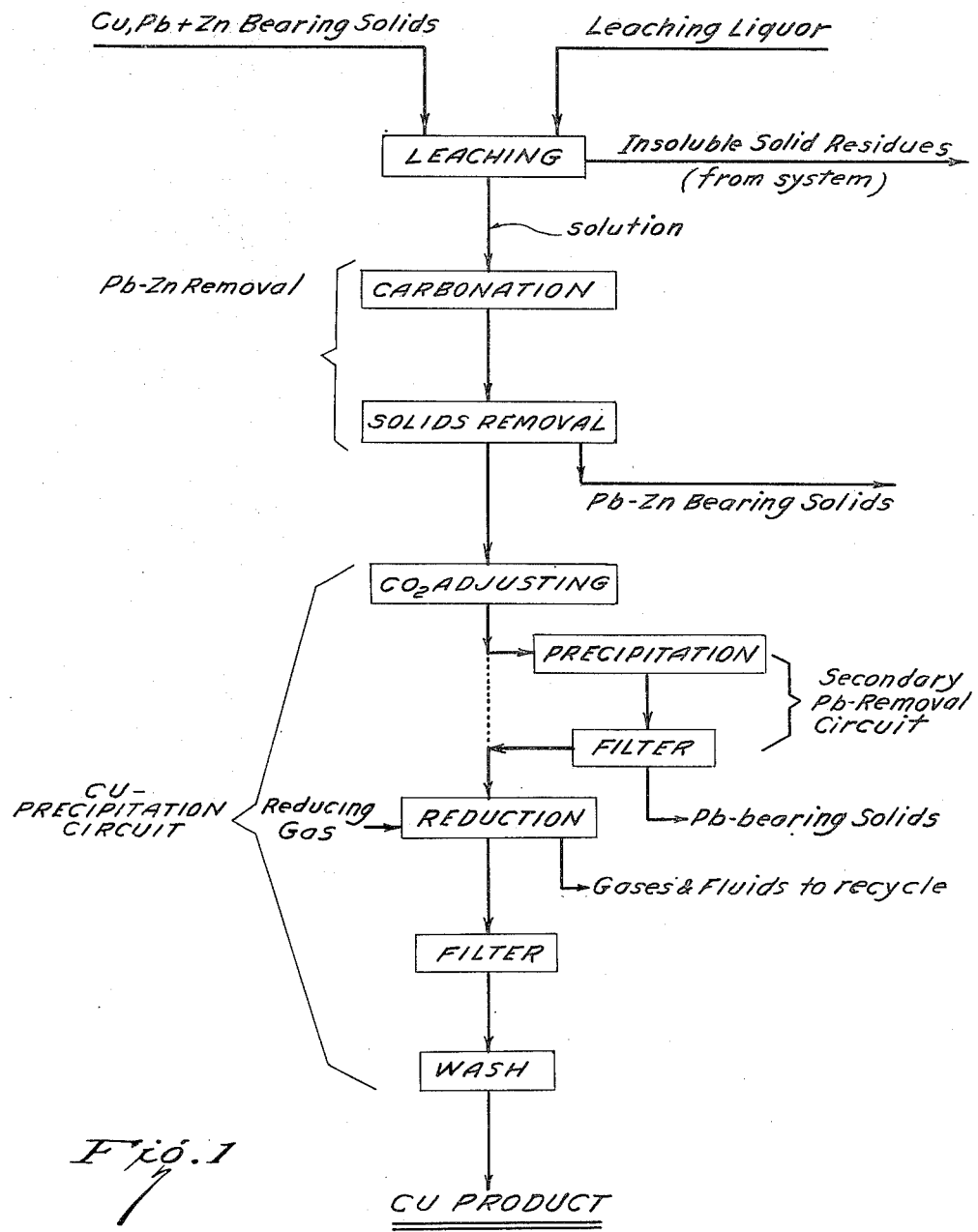

INVENTOR
PATRICK J. McGAULEY,
BY
ATTORNEY

United States Patent Office 2,695,842
Patented Nov. 30, 1954

2,695,842

RECOVERY OF COPPER FROM LEACH LIQUORS CONTAINING ZINC AND LEAD

Patrick J. McGauley, Glen Cove, N. Y., assignor to Chemical Construction Corporation, New York, N. Y., a corporation of Delaware Application September 4, 1951, Serial No. 245,062

5 Claims. (Cl. 75—108)

The present invention relates to the recovery of non-ferrous metals, particularly copper, from ores, ore concentrates, blister, scrap metal and the like. In particular, it is concerned with an improved process whereby the non-ferrous metal content of such materials may be quickly, simply and easily leached and subsequently recovered. Still more specifically, it deals with the recovery of a highly pure copper product from various sources, including copper-bearing scrap and blister, in a form substantially free from zinc and/or lead when such metals are in the original feed source.

Non-ferrous metals have been the subject of a constantly increased demand in the metal trades. At the same time, there has been a marked decrease in the available reserves of high-grade ore and the costs of mining and refining the lower grades have continually increased. These conditions have resulted in a marked demand for improved methods of producing such metals from ores and ore concentrates and for the recovery of such metals from scrap and other low-grade sources. Copper production and recovery, for example, presents most of the problems involved and will be used, therefore, as illustrative in discussing the present invention.

In the field of copper recovery, particularly from scrap, the better current practices are readily illustrated. Copper-bearing scrap is charged into large leaching vats and flooded with a dilute, oxidized solution of ammoniacal copper carbonate. A flow of leach liquor, small relative to the total volume, is continuously drawn off, pumped through an oxidizing process and returned to the leaching tanks as leaching fluid. Thus, copper in solution is alternately oxidized to the cupric condition and then reduced to the cuprous condition in the act of dissolving more copper. Usually, new barren solution is regularly added to the system and pregnant solution is withdrawn at about the same rate. Copper is precipitated and recovered, principally as an impure cuprous oxide, by distilling off ammonia and carbon dioxide, both the dissolved gases and those formed in decomposing the dissolved salts. Mother liquor from the system is usually discarded. Ammonia and carbon dioxide are condensed in water and recovered for reuse. Much the same system has been tried on ores and ore concentrates at different times.

While such systems appear simple, unfortunately they have not been found wholly satisfactory. This is due to one or more of several reasons. For example, not only the copper but other soluble metallic impurities are gradually dissolved into a relatively dilute solution, even though the solution rates of various metals are not necessarily the same. While copper and zinc dissolve at approximately the same rate, nickel, cobalt and other impurities will also dissolve, though at a somewhat slower rate. Even some lead may dissolve, though only to a low saturation level. More than sufficient time is used to allow not only for the dissolution of the copper but also any zinc and many other soluble metals to be dissolved. They are later precipitated in the still as impurities in the copper oxide powder.

It will be further noted that this process is extremely slow. Leaching of normal copper scrap with such dilute solution requires a large inventory, because of the necessary leaching period of three to six weeks and often more. This unreasonably long leaching period requires an expensive inventory, both in metal and ammonia. The carrying charges thus become an important item in the total processing cost. Further increasing the cost is the high overhead on the necessary equipment to handle the excessive amount of solution.

Other objections include the fact that copper and zinc oxides and carbonates precipitated in the still tend to build up on the inside of the vessel and must periodically be removed by hand labor. The high steam requirements of the still are a very important part of the cost of the process. The resulting impure copper product must be reduced and refined before it is marketable as commercial copper metal, which is usually required to be at least 99.9% pure copper plus silver. Lead and zinc impurities may be distilled off during the reducing and refining operation. However, iron, nickel, cobalt and the like, if dissolved during leaching, will remain with the copper. To remove them requires additional and expensive separation steps. Therefore, their presence in appreciable quantities markedly reduces the utility of the resulting impure oxides and carbonates.

While it would seem fairly simple to increase the leaching rate and obviate these difficulties, the utility of this proposal is more apparent than real. For example, it would appear both simple and desirable to increase the concentration of the leaching liquor thus decreasing both time and equipment requirements. However, if this is done, the economy of still operation will be radically altered. This is not desirable, since the economy of still operation in this process is such that it is advisable, if not necessary, to treat only dilute solutions as in the current practice. The increased cost of distilling more concentrated solutions will more than offset any economic gain from the shorter leaching period.

There remains, therefore, a commercial demand for a process, the utilization of which is not hampered by these and other drawbacks. One such process is disclosed and claimed in my copending application with Louis N. Allen and Edward S. Roberts, Serial No. 200,794, filed December 14, 1950, now Patent No. 2,647,831, which application is itself in turn a continuation-in-part of our copending applications, Serial Nos. 133,666 and 165,524, filed December 17, 1949, now Patent No. 2,647,830 and June 11, 1950, now Patent No. 2,647,832, respectively.

In these noted copending applications, processes are disclosed in which many of these difficulties can be overcome. However, none of the processes disclosed therein offer their maximum usefulness where there is a high proportion of zinc and an appreciable amount of lead in the available feed solids. Such a problem occurs when the scrap metal to be treated contains a high proportion of scrap brass, for example. It is, therefore, the principal object of the present invention to provide an operating process which is particularly well adapted to handle the treatment of feeds containing high quantities of zinc and which is not embarrassed by a relatively high proportion of lead when such a situation occurs.

In accordance with the present invention, these objects have been met in a process which itself utilizes some of the better features of the above-noted copending applications. It retains the general overall flowscheme in which the non-ferrous metal values may be quickly and easily put into solution with the general methods of metallic precipitation shown therein, but is an improvement thereover, in that it provides for the prompt removal, immediately after leaching, of the zinc content of the leach liquor together with any lead which may be present therein in solution, or carried in the leach liquor by entrainment of finely-divided lead, lead salts or lead-containing solids.

Figure 2:
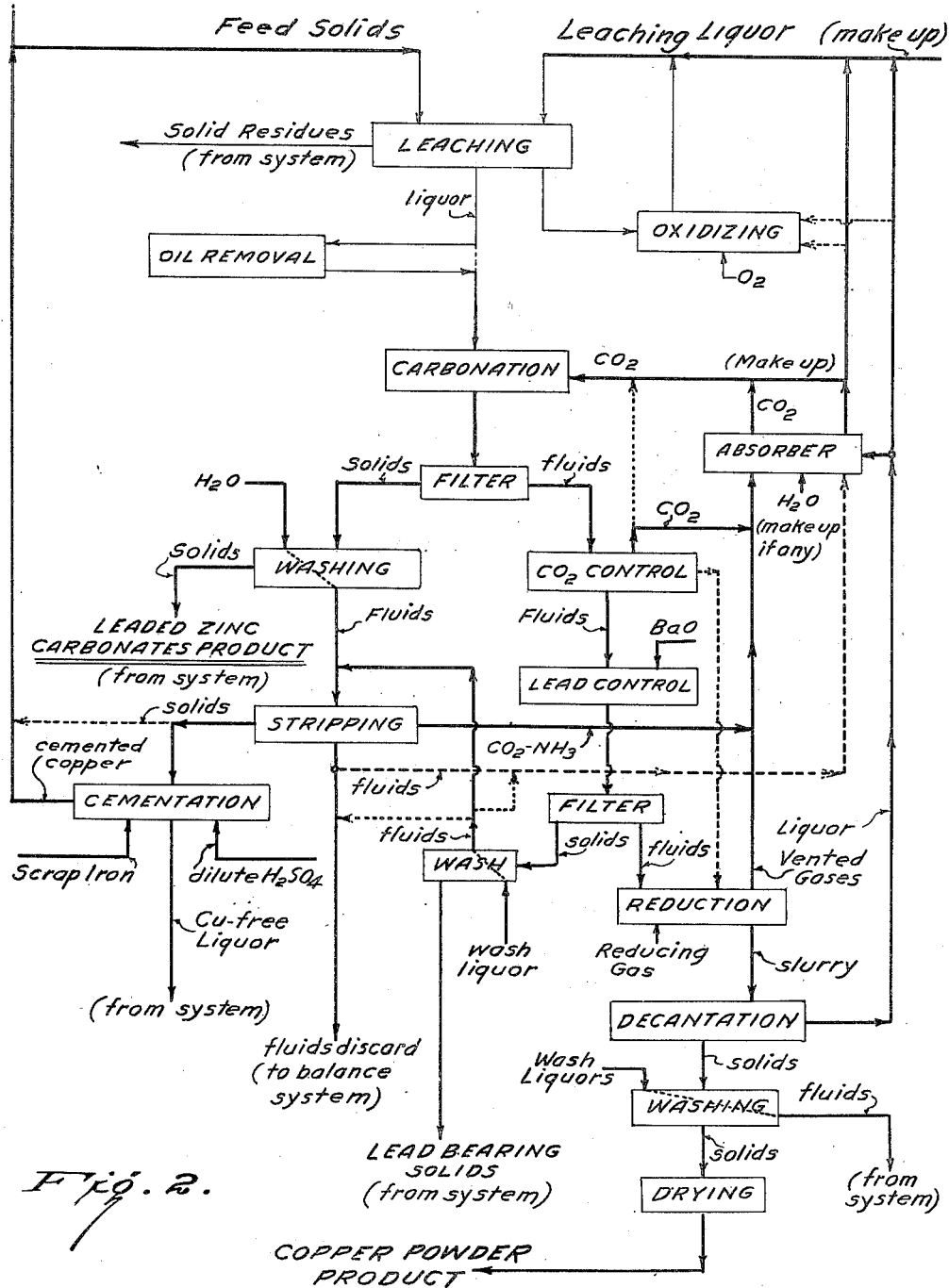

A discussion of the details of the invention may be aided by reference to the accompanying drawings in which:

Figure 1 is a simplified flowsheet showing the operational sequences in the present invention; and Figure 2 is a more detailed flowscheme showing an illustrative embodiment of the invention.

As will be seen from a consideration of the drawings, the first step outlined is designated as the leaching operation. As shown, feed solids containing a recoverable content of at least copper non-ferrous metals are put into the leaching system and treated with a suitable leaching liquor. On completion of the dissolution of non-ferrous metals, the residue is removed from the system of the present invention and the pregnant leach liquor is withdrawn.

In any overall process such as that of the present invention, the leaching operation is of marked importance. Although the specific leaching system used in the overall process is not a limitation on the process of the present invention, a leaching technique such as disclosed in the above-noted, copending application, Serial No. 133,666, is preferred. As there brought out, a most desirable improvement is to circulate substantially the entire body of leaching liquor, i. e., the aqueous ammoniacal copper salt solution, over the solids mass. Such relative movement of liquor should be very high, compared to that in the conventional practice discussed above, and be at least 0.01–0.05 feet per second over the solids. Too high a rate may involve an excessive power consumption, and therefore the circulation rate ordinarily will not exceed about 5 feet per second. In most cases, it will not exceed about 0.5–1.0 feet per second.

Actual operation preferably is conducted using a number of tanks, solution being recirculated through each to obtain the desired velocity. The gross quantity of copper being leached per unit of time within a given tank gradually diminishes as the available copper surface decreases. Accordingly, it is desirable to use the plurality of tanks simultaneously but each at a different stage in the leaching operation. In this way, a substantially constant overall rate of leaching may be maintained for the system.

Several additional features which affect the leaching rates should also be considered. The rate increases as the temperature increases. Accordingly, the temperature of operation should be as high as practicable without seriously reducing the solubility of the ammonia in the leach liquor. However, most, if not all, of the recycled leach liquor will pass through an oxidation system and, in general, no particular attempt need be made to actually increase the leaching temperature above that of the effluent therefrom. This will usually range from about 100° to about 135° F. Precautions should be taken to avoid heat loss during oxidation and, if possible, in the leach system, so as to maintain as high reaction rates as possible.

As is also brought out in the above-noted application, the leaching rate is affected by, and over a considerable range is directly proportional to, the amount of available cupric copper in the leaching liquor. This may be varied considerably. It has been found preferable to use a leach liquor initially containing at least 20, but not more than 110, grams of cupric copper per liter.

It is not necessary that leach solution be dilute, as in the conventional practice. It is an advantage of the present invention that the system is in no way limited by the economy of still operation, which in the past limited the concentration of the leaching liquor. In fact, using the preferred embodiment, a concentrated leaching solution is not only possible but is highly desirable for best metallurgical results. The dissolved salt content of the effluent leach liquor, therefore, will ordinarily be kept as high as convenient. It should not be so high that copper, copper salts, or other solids may precipitate in the system other than in the precipitation vessels. Depending on the other dissolved salts content, the total copper content may go as high as about 200 grams per liter or a little higher during operation. But in normal practice, particularly when appreciable amounts of zinc are being dissolved with the copper, this upper limit will be considerably reduced. If precautions are not taken with respect to this limitation, some salting out effect may be encountered.

The leaching system discussed may be substituted by any system or schedules preferred by the particular operators. In any case, however, a side flow from the leaching system through an oxidizing procedure in which cuprous copper in the leach liquor is continually oxidized to cupric copper and recycled, will be utilized. Such an operation is shown on the flowsheet of Figure 2.

One additional desirable step is shown in Figure 2. Much of the source material will be scrap metal which will have picked up large quantities of dirt, oil, grease and the like in the course of its past history. If the scrap material is not received in a clean condition, it should be cleaned and/or washed of such dirt and oily contaminants so far as practicable before being fed to the leaching solution. If this is not done, the leach schedule is seriously interfered with. Despite such precaution, there is usually some oil carried by the solids taken to the leaching system. Much of the oil so carried will be picked up by the pregnant leach liquor. To allow it to remain will interfere with subsequent processing. In such cases, the leach liquor should be passed through an oil-removal step. This is shown simply as such on the drawing. It may be done in any desired way as, for example, by passing the leach liquor through a coke-packed tower or some mechanically or chemically equivalent operation.

Up to this point, the steps in the treatment have been principally a preparation of a suitable pregnant leach liquor for further treatment in the process of the present invention. As shown in Figure 1, this treatment may be roughly divided into three parts or circuits. In the first, the liquor is treated to precipitate so much as possible, usually substantially all, of the zinc dissolved during leaching. This at the same time removes a major portion of the lead dissolved in or carried by the liquor. In the second, which in some cases may be omitted, is the further elimination of residual lead-bearing material which may be entrained in some manner as finely divided solids and carried through the zinc-precipitation operations. Finally, in the third circuit the carbonate content of the previously treated liquor is adjusted to that most favorable for copper precipitation and the copper product is actually precipitated.

In the following discussion, these portions of the system will be considered substantially in that order. An illustrative embodiment of each will be discussed, showing the general limitations which should be observed for the most successful operation of the process as a whole. It should be realized, however, that three separate processes are not necessarily involved because each of the so-called "circuits" of the process are necessarily interlocked with the others to produce an efficient overall process.

As will be seen from the drawings, the first operation in the zinc-lead removal circuit is a step called carbonation. In this operation, the carbonate content of the pregnant liquor is increased by dissolving carbon dioxide therein. Sufficient $CO_2$ is dissolved to provide an excess of carbonate ions over those required to balance the free ammonium ions. When the necessary $CO_2$ concentration is reached, the dissolved soluble zinc salts are converted to insoluble carbonates. Since these zinc carbonates and the like are substantially insoluble, precipitation proceeds almost quantitatively to an equilibrium value at which little or no zinc remains in solution.

Actual carbonation may be carried out in any desired way. In one embodiment of the practice, the solution is run into a suitable tank or tanks in which it is subjected to a suitable and preferably substantially constant carbon dioxide pressure. In practice, from about 5–100 pounds per sq. in. gauge is a good operational range. While lower pressures are operable, at below about 5 pounds per sq. in. gauge reaction is too slow and pressure above about 50 pounds per sq. in. gauge is not economically justifiable. About 25–30 pounds per sq. in. gauge represents a good optimum practice. Operation may be carried out in a continuous or a batchwise manner, provided sufficient capacity is available to handle the volume of flow drawn from the leaching system. In continuous operation, either manual or automatic controls may be provided, various mechanical devices for the purpose being commercially available. Carbonation will ordinarily be carried out at about the temperature of the available process water, preferably at not over about 70° F., to insure proper gas solution for effective zinc precipitation.

While the precipitate has been referred to as zinc carbonates, it is a mixture of compounds including ammonium carbonate and bicarbonate, basic zinc carbonate containing about 10% ammonia and some copper ammonium carbonates which, to the extent they form, are insoluble to about the same degree as those of zinc. It is a novel feature of the present process, however, that it is possible to control the carbonate content by the use of the correct carbonation pressures noted above so that the zinc will be precipitated preferentially and the precipitate will have only a small copper content.

While it is not intended to limit the invention to any particular theory of operation, it is believed selective precipitation by carbonation is due to differences in the soluble copper and zinc complexes at the operating conditions. For zinc and copper carbonate to remain dissolved, there must be one available mole equivalent of ammonium carbonate for each mol of metal. In addition, each mol of zinc requires four mols of available ammonia, above the amount required to balance the available carbonate ions, whereas copper needs but two. Further, ammonia associated with copper is in some way more resistant to conversion to ammonium carbonate than that with zinc. Zinc not only needs more ammonia to remain in solution but loses it more easily.

For this reason, the carbonate content of the solution is progressively built up. The associated ammonia in the soluble zinc complex is thus converted to ammonium carbonate and/or bicarbonate until the residual available ammonia is not sufficient to hold the zinc in solution. According to the present invention, it has been found that substantially all the zinc can be precipitated before any appreciable amount of copper will come down.

This makes control of carbonation simple. When copper begins to precipitate, the color of the latter changes. From a white precipitate, colored only by a little easily washed out purple solution, during zinc precipitation, precipitation of any copper colors the precipitate dark blue if cupric copper and green if cuprous. Accordingly, carbonation is stopped as soon as a color change occurs. A better practice is to use a timed cycle, based on previous runs, and stop just before this point. Any residual zinc in solution will not interfere with the subsequent reduction of copper and being eventually recycled to leaching, there is no direct loss. It is for this reason that it is necessary, as noted above, to carbonate only under sufficient pressure to obtain a reasonable rate of precipitation and that too fast a rate, i. e., too high a carbonation pressure should be avoided as harder to time, unnecessary, not useful and, if above thirty pounds per sq. in. gauge, requiring more expensive tanks.

It should also be noted that the lead carbonates are equally, if not more, insoluble than those of zinc under the operating conditions. Therefore, substantially all lead which dissolves during leaching is converted to insoluble lead salts during carbonation. In addition, most of the entrained or suspended lead, whatever its form, is carried down by the precipitate. The latter, therefore, will be a leaded-zinc concentrate if the feed solids contain lead.

The next step in the treatment is a solids-fluids separation, carried out, for example, as shown in Figure 2, on a suitable filter. If so desired, the filter may be substituted by some suitable mechanical equivalent. From the filter, or its equivalent, the solids are passed along one flowline and the fluids along another.

Of the solid constituents, several components have definite marketable values and ordinarily may not be discarded. Accordingly, the separated solids are first washed in some suitable equipment. Usually, a series of several washings with cold water are adequate to dissolve all the ammonium carbonate and bicarbonate and copper ammonium carbonates. The residue will comprise a mixture of basic zinc carbonate containing some 10% ammonia and almost all of the lead removed from solution. Very little, if any, zinc is dissolved by a cold water washing. For this reason, the washing liquors should be maintained as cool as practicable, preferably below about 70° F., i. e., washing it at about the temperature of the carbonation. Above about this level zinc may be dissolved to excess.

In connection with this washing, one further fact should be noted. Precipitates of cuprous copper are more readily dissolved in the cold wash water than those of cupric copper. If appreciable quantities of the latter must be redissolved, the necessary volume of wash water creates a treating problem at a later stage. Accordingly, this is one additional reason for withdrawing liquor from the leaching circuit with as high a proportion as is practicable of the copper content in cuprous condition. The cupric copper content of the total dissolved copper should not exceed about 50% or copper losses may occur in the zinc precipitate due to washing difficulties. This is not only undesirable as a direct loss, but also indirectly in that it contaminates the lead-zinc precipitate.

The washed solids may be sold as a lead-zinc precipitate as taken from the system. They also may be further treated, if so desired, to convert them to leaded basic zinc carbonate or oxide, by steam stripping or calcining to remove ammonia and/or carbon dioxide.

The effluent washing fluids are treated to discard water from the system and recover the content thereof which cannot be economically discarded. The total volume of fluid cannot be recycled because of the additional water used during the washing. This treatment may be considered part of the zinc removal circuit although, in fact, it is an operation tied in with several of the other circuits.

As shown in Figure 2, washing fluids are sent to a stripping operation. This operation may be carried out in any suitable type of still. This distillation is not subject to the low concentration limitations of the still practice used to precipitate metal oxides and drive off gases in the above-discussed conventional operation. In the present process, the still may, and should be, if possible, a type which can be driven at fairly high rates without incurring operational difficulties. Essentially, the stripper still produces three products. These may be designated as the off-gases, the stripped fluids and a solids precipitate. These will be considered separately.

The solids products, which will contain the redissolved copper ammonium carbonate residue, cannot be discarded. Preferably, this solids fraction is sent to some operation which will separate out the copper content for recirculation. As shown in Figure 2, it is sent to a cementation tank in which it is treated with scrap iron and dilute aqueous sulfuric acid, the copper content being dissolved and again precipitated without the other metals. Fluid containing the residual dissolved metals is drawn from the system as a copper-free liquid. If so desired, this may be discarded since the metal content will ordinarily be small. If desirable or necessary, the solution can be treated in other circuits to recover the nickel, tin, iron and other like dissolved metals.

The cementation operation, or an equivalent, will be used where the content of extraneous metals other than copper in the solids fraction is high because a direct recycling to the leaching circuit would gradually build up a higher and higher concentration of these metals in the leach liquor. They would then pass into the copper precipitation circuit in sufficient quantities to create contamination of the copper product. Where the extraneous metal content is sufficiently low, however, all or a part of the solids may be directly recycled without being passed through the cementation step. This is shown by the dotted optional flow line at the lower left of the flowsheet.

The other two products from the stripping still are handled somewhat differently. The off-gases are taken to an absorber for the recovery of the carbon dioxide and ammonia content thereof, as will be discussed below. The fluid discharge is divided. A portion, in sufficient quantity to keep the circuit in overall water balance, is discarded. The excess, if any, is used to absorb gases in the absorber. This will also be further discussed below.

Returning to the original solids separation, it will be seen that the first operative treatment on the fluids is designated as a $CO_2$ control. This, in effect, is an initial adjustment of the $CO_2$ content of the clarified fluids for effective reduction of copper with a reducing gas. Normally the carbonate content of the solution after carbonation is too high for this operation. It is initially adjusted by passing the fluid to a suitable tank, or series of tanks, in which it is gently heated to drive off the necessary amount of $CO_2$ to bring the carbonate content into the desired operating range. This operation, usually conducted at atmospheric pressure, involves heating to about 180° F., at which temperature the $NH_3$ and $CO_2$ concentrations of the liquors become substantially constant.

While the liquor coming from the filter may contain from about 140–200 grams per liter of copper, in good average operating practice this should be about 160–170, of which about 100 grams per liter should be in the cuprous condition. In addition, such a solution will contain about 120–150 grams per liter of ammonia, 120–200 grams per liter of $CO_2$, possibly 5–10 grams per liter of zinc and 0.08–0.15 gram per liter of lead. The carbon dioxide concentration should be reduced in the heating operation to about 130–135 grams per liter, or about equal to the molar equivalent of copper. This can be done readily without appreciably altering the concentrations of the other constituents. Carbon dioxide driven off should be collected for recirculation. It may be passed either to the absorber, as shown on the flowsheet, or alternatively, as shown in the dotted line, it may be returned directly to the carbonation operation.

In the preceding paragraph, it was noted that the liquor prior to the carbonate adjustment may contain as much as 0.15 gram per liter of lead and usually will contain about 0.50–0.08 gram per liter. This figure is somewhat deceptive. Very little lead is in solution as lead salts. During carbonation much of the lead or lead salts is precipitated in a very finely-divided form. In the finer sizes, the particles are small enough to be entrained in the fluid in semi-permanent suspension and be carried with the fluid fraction through the filter. Usually the lead content is higher than desirable to send to an efficiently operating copper reduction. If not, the fluid may be directly passed to the reduction step, as shown by the dotted optional line in Figure 2. However, where the lead content is undesirably high, the fluids before reduction are passed through a lead control system.

The actual control of the lead content is simple. It may be accomplished by adding any quickly-settling flocculating agent. A preferred practice, however, is to add a small amount of an alkaline earth metal oxide, usually that of barium or calcium. The resultant precipitate of alkaline-earth carbonate carries with it a large proportion of the suspended lead. For example, the addition of from about one to three grams per liter of barium oxide will reduce the residual lead carried in the fluid to about 0.03 gram per liter or less. This concentration is acceptable for most reduction purposes.

The lead-barium solids precipitate is removed by some suitable solids-liquid separator, such as the filter shown in Figure 2. From the latter, the clarified fluid is passed directly to the reduction system. The filter cake is washed and the washed cake having little value, will usually be discarded. Washing usually is carried out with water to recover any desirables, such as the $NH_3$ or $CO_2$ content associated therewith. Washing fluids may be treated in any of several ways. If the $NH_3$ or $CO_2$ content is high, it may be recycled to the stripping still, as shown in Figure 2. However, all or part may be recycled to the absorber as absorption fluid if so desired, or discarded as shown in the dotted solid line.

Fluid after removal of the lead-barium precipitate is passed directly to the reduction system. In the latter, the principal operation is the precipitation of copper powder itself. While the reduction may be carried out in any suitable manner, it must be one capable of giving a satisfactory copper metal product, both in quantity and quality. One such procedure is disclosed in the above noted copending application. As shown therein, precipitation is accomplished with a reducing gas by heating, usually with steam, to above about 250° F., usually about 300°–400° F. when CO is the reducing gas and 350°–500° F. when hydrogen is used. These temperature ranges give good operating cycles with respect to time, which obviously will vary somewhat with the temperature. Higher temperatures may be used if so desired, but the equivalent pressures are high and such temperatures are not needed. Reducing gas is supplied either directly as a supernatant atmosphere or from below the liquid surface.

Substantially any suitable sulfur-free reducing gas may be used. While hydrogen is to be preferred, carbon monoxide is also excellent if available in sufficient quanity. Sulfur-free producer gases and the like containing mixtures of CO and $H_2$ may be used.

Within this general range of reducing conditions, in accordance with the present invention, a somewhat more limited schedule is found to be preferable. In the preferred practice, the copper-bearing liquor, from which copper is to be precipitated, is placed in a suitable vented pressure tank, or series of tanks. The fluid is then heated without the application of reducing gas to about 325–375° F. for the final carbonate adjustment. The venting pressure is controlled, either manually or automatically, during this period to about 125–175 pounds per square inch gauge, the usual practice being in the neighborhood of about 150 pounds per square inch gauge. Carbon dioxide and water vapor constitute the main constituents removed, very little ammonia being driven off under these conditions. Vented gases comprising the carbon dioxide, water vapor and any ammonia, are taken to the absorber.

After venting is completed, and at the approximate temperature then existent in the solution, the pressure is raised to about 900 pounds per sq. in. by admission of reducing gas. Pressure is maintained for sufficient time to insure reduction of substantially all of the copper which will come down in a sufficient degree of purity.

In general, the reduction cycle will produce a copper slurry, the fluid containing some 15–25 grams per liter of residual dissolved copper. This slurry is passed to a suitable pressure-relieving and decanting tank. Pressure can be relieved before decantation, during decantation or after decantation without departing from the intended process of the present invention. The actual stage at which the pressure relieving is carried out will be dependent upon the available apparatus.

The fluid is decanted or otherwise separated from the solids content of the slurry and recycled. Part may be used as absorbing fluid in the operation of the absorption system for ammonia and carbon dioxide recovery. The remainder is recycled as leaching liquor. If so desired, a part of this returned decanted liquor may be passed through the oxidizing tower as shown in Figure 2 by a dotted optional flowline. Ordinarily, however, its copper content is sufficiently low that this is not necessary.

Copper powder from the decanting operation is washed. Washing may be carried out in any suitable apparatus. The particular washing operation used forms no part of the present invention. Subsequent to the washing, solids are passed to a suitable dryer and dried, preferably in the presence of reducing gas to give the resultant product powder.

In order to show the efficiency of the process of the present invention, the following example, which is intended for purposes of illustration, and not by way of limitation, is given.

*Example*

A solids feed comprising a mixture of brass scrap, some blister copper and assorted low-grade copper scrap was leached with an aqueous ammoniacal solution of copper carbonate. The pregnant leach liquor was withdrawn at intervals. Samples thereof averaged about 140 grams per liter of copper, of which about 90 grams per liter was cuprous copper. In addition, the liquor contained about 65 grams per liter of zinc and about 1.5 grams per liter of lead. The ammonia and corbonate contents were about 175 grams per liter of ammonia and 140 grams per liter of carbon dioxide. After corbonation at 50 pounds per sq. in. gauge, the resultant slurry was filtered, yielding a fluid containing about 165 grams per liter of copper, 135 grams per liter of ammonia, 170 grams per liter of $CO_2$, 8 grams per liter of zinc and about 0.09 gram per liter of lead. This fluid was gently heated at about 180° F. until the $CO_2$ concentration was reduced to about 130 grams per liter. The heated liquor was treated with about 2 grams per liter of barium oxide and the resultant precipitate filtered out. After filtration, the lead content was found to be about 0.03 gram per liter. The filtered liquor was passed to an autoclave and heated therein at 350° F. and 150 pounds per sq. in. gauge, vent pressure, until the evolution of carbon dioxide substantially ceased. The pressure was then increased to about 900 pounds per sq. in. gauge with hydrogen gas and a temperature of about 350° F., maintained for about 1½ hours. At the end of this time, the vessel was pressure-relieved, the slurry discharged and the precipitated copper collected. The residual fluid was found to contain about 20 grams per liter of cuprous copper and the solids, after a series of washings with water and 10–15% aqueous acetic acid, were dried and found to represent a yield of about 120 grams per liter of original leach liquor in a product assaying 99.91% copper.

I claim:
1. In a chemical precipitation process for the production of zinc-free metallic copper which includes the preparation of an aqueous solution of ammonium carbonate containing dissolved ammonia, copper, and at least one metal selected from the group consisting of zinc and lead, the improvement which comprises the combination therewith of introducing carbon dioxide under positive pressure into the ammoniacal copper-containing solution until precipitation of ammonium carbonates occurs, continuing the addition of carbon dioxide, whereby precipitation of non-copper carbonates occurs, until the residual dissolved non-cuprous metal product approaches the solubility limit at the operating conditions but stopping the addition of carbon dioxide before the precipitate contains an appreciable content of colored copper compounds.

2. In a chemical precipitation process for the production of zinc-free metallic copper which comprises the preparation of an ammoniacal ammonium carbonate copper and zinc containing solution, the zinc being in minor proportion to the copper, the improvement which comprises the combination therewith of preparing the ammoniacal copper-containing solution, introducing carbon dioxide and adjusting the content thereof to a substantially 1:1 molecular ratio to copper and then subjecting resultant solution to superatmospheric pressure at an elevated temperature in the presence of a sulfur-free reducing gas, whereby zinc-free copper is precipitated.

3. In a chemical precipitation process for the production of zinc-free metallic copper the improvement which comprises the preparation of an ammoniacal copper-containing solution with a metal content from about 140 to about 165 grams of copper and a minor proportion of zinc per liter, introducing carbon dioxide and adjusting the content thereof to a substantially 1:1 molecular ratio to copper, and then heating in the presence of a sulfur-free reducing gas at a temperature of from about 250° F. to about 500° F. and at least an equivalent superatmospheric pressure, whereby zinc-free copper is precipitated.

4. In a chemical precipitation process for the production of zinc-free metallic copper which comprises the preparation of an ammoniacal copper-containing solution, the improvement which comprises the combination therewith of saturating an ammoniacal copper-containing solution having a metal content from about 140 to about 165 grams of copper and up to about 65 grams of zinc per liter with carbon dioxide under positive pressure, cooling, separating precipitated material and liquid, heating the liquid with expulsion of carbon dioxide and adjustment of the molecular ratio thereof to copper to substantially 1:1, and then heating in the presence of a substantially sulfur-free reducing gas to a temperature from about 250 to about 500° F. and at least an equivalent superatmospheric pressure, whereby zinc-free copper is precipitated.

5. In a chemical precipitation process for the production of zinc-free metallic copper which includes the preparation of an aqueous solution of ammonium carbonate containing dissolved ammonia, copper, and at least one metal selected from the group consisting of zinc and lead, the improvement which comprises the combination therewith of; introducing carbon dioxide under positive pressure into the ammoniacal copper-containing solution until precipitation of ammonium carbonates occurs, continuing the addition of carbon dioxide, whereby precipitation of non-copper carbonates occurs, until the residual dissolved non-cuprous metal content approaches the solubility limit at the operating conditions and stopping the addition of carbon dioxide before the precipitate contains an appreciable content of colored copper compounds, separating precipitated material from liquid, and then heating the liquid with expulsion of carbon dioxide and adjustment of the molecular ratio thereof to copper to an amount sufficient for subsequent effective gas reduction of at least part of the copper content of the solution.

References Cited in the file of this patent

UNITED STATES PATENTS

| Number | Name | Date |
|---|---|---|
| 654,804 | Rigg | July 31, 1900 |
| 1,634,338 | Pierce | July 5, 1927 |
| 1,686,391 | Muller et al. | Oct. 2, 1928 |
| 2,488,201 | Kenny et al. | Nov. 15, 1949 |
| 2,617,711 | McAllister | Nov. 11, 1952 |

FOREIGN PATENTS

| Number | Country | Date |
|---|---|---|
| 237,308 | Great Britain | June 30, 1925 |
| 287,186 | Great Britain | Mar. 19, 1928 |

OTHER REFERENCES

Latimer, W. M., "The Oxidation States of the Elements and Their Potentials in Aqueous Solutions," Prentice-Hall, Inc., New York, N. Y.; first edition (1938), pages 3, 4 and 299–301.